(12) United States Patent
McCarty, Jr. et al.

(10) Patent No.: US 7,012,981 B2
(45) Date of Patent: Mar. 14, 2006

(54) METHOD AND APPARATUS FOR IMPROVING DATA FRAME SYNCHRONIZATION IN A LOW SNR ENVIRONMENT

(75) Inventors: Robert J. McCarty, Jr., Plano, TX (US); William L. Priest, Plano, TX (US)

(73) Assignee: CynTrust Communications, Inc., Dallas, TX (US)

( * ) Notice: Subject to any disclaimer, the term of this patent is extended or adjusted under 35 U.S.C. 154(b) by 1193 days.

(21) Appl. No.: 09/835,709

(22) Filed: Apr. 17, 2001

(65) Prior Publication Data

US 2002/0159553 A1    Oct. 31, 2002

(51) Int. Cl.
*H04L 7/04*    (2006.01)

(52) U.S. Cl. ............... 375/362; 375/240.28; 375/354; 370/509

(58) Field of Classification Search ............... 375/362, 375/240.28, 354; 370/509
See application file for complete search history.

(56) References Cited

U.S. PATENT DOCUMENTS

| | | | |
|---|---|---|---|
| 5,280,501 A | 1/1994 | Owen | 375/340 |
| 5,282,227 A | 1/1994 | Crawford | 375/327 |
| 5,523,856 A | 6/1996 | Kawano et al. | 386/84 |
| 5,666,378 A | 9/1997 | Marchetto et al. | 375/222 |
| 5,901,180 A * | 5/1999 | Aslanis et al. | 375/261 |
| 6,002,709 A | 12/1999 | Hendrickson | 375/150 |
| 6,134,283 A * | 10/2000 | Sands et al. | 375/354 |
| 6,359,933 B1 * | 3/2002 | Aslanis et al. | 375/260 |
| 6,744,746 B1 * | 6/2004 | Bartelme | 370/329 |

OTHER PUBLICATIONS

U.S. Appl. No. 09/295,660, filed Apr. 1999, West.

* cited by examiner

*Primary Examiner*—Stephen Chin
*Assistant Examiner*—Ted Wang
(74) *Attorney, Agent, or Firm*—Dan Brown Law Office; Daniel R. Brown

(57) ABSTRACT

A method of apparatus for achieving and maintaining alignment of a data receiver to data frames in the presence of noise is taught. A statistical weighting process is employed to sample synchronization symbols that reoccur in data frames. The information is used to maintain alignment to the data frames by tolerating a greater number of data errors. A plurality of synchronization symbols are decoded with a weighted probability of error in decoding determined for each. The weighted probabilities are combined and the resultant value is compared to a threshold value. If the threshold is met, then alignment is achieved or maintained based upon the statistical process. Improved performance in lower SNR environments is achieved.

60 Claims, 11 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 39 | 29 | 29 | 1 | 0 | 0 | 1 | 0 | 29 | 21 | 21 | 1 | 0 | 0 | 1 | 0 |
| 8 | 29 | 21 | 21 | 1 | 0 | 0 | 1 | 0 | 39 | 29 | 29 | 1 | 0 | 0 | 1 | 0 |
| 5 | 0 | 0 | 0 | 1 | 29 | 39 | 1 | 29 | 0 | 0 | 0 | 1 | 21 | 29 | 1 | 21 |

Fig. 7

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 10 | 7 | 7 | 2 | 1 | 0 | 2 | 1 | 8 | 5 | 5 | 7 | 0 | 0 | 1 | 0 |
| 8 | 8 | 5 | 5 | 1 | 0 | 0 | 1 | 0 | 10 | 7 | 7 | 1 | 1 | 0 | 1 | 1 |
| 5 | 0 | 1 | 1 | 2 | 7 | 10 | 2 | 7 | 0 | 0 | 0 | 1 | 5 | 8 | 1 | 5 |

Fig. 8

METHOD AND APPARATUS FOR IMPROVING DATA FRAME SYNCHRONIZATION IN A LOW SNR ENVIRONMENT

BACKGROUND OF THE INVENTION

1. Field of the Invention

The present invention relates to data communications. More specifically, the present invention relates to improved data frame synchronization in data communication systems.

2. Description of the Related Art

Modern communication systems frequently employ data as a means of communicating information. Data is useful for the purpose of communicating audio, data, and control information. When data is employed as the information medium, it must be arranged into a format that is consistently applied at both the transmitting and receiving ends of the system so that orderly and efficient communications are possible. A common data formatting approach is TDMA (Time Division Multiple Access) which uses TDM (Time Division Multiplexing) of the data bits. Data bits are arranged into data frames of predetermined length and are sent from a transmitter to one or more receivers. The physical medium can be radio waves, metallic conductors, or fiber optic conductors. Each receiver must synchronize to the received frames so that the data can be decoded in a way that is predetermined for the particular system and protocol. Typically, such systems use synchronization symbols, which are groups of data bits, as a reference to each data frame for accurately locating the data frame in time.

In operation, receivers that are first activated must align themselves to the data frames so that each can be ready to communicate when needed. Re-alignment needs to occur when a receiver loses alignment for some other reason. Alignment involves finding the carrier signal, locating the data pulses therein, and identifying the synchronization symbol within the data frames. In some systems, where two-way communications are employed, the receivers may need to reply to the transmitters in some fashion. In the case of a radio communications system, radio units may need to check-in to identify their presence and availability for communications. In any event, the process of a receiver aligning to the data frames of a communications system involves some time, which defines a period of unavailability for communications. Naturally, it is preferable to keep the time of unavailability to a minimum.

All communication systems are subject to the detrimental effects of noise. The greater the amount of noise present, relative to the data signal strength, the more problematic the noise is to efficient and reliable communications. This relationship is defined as a signal to noise ratio (or "SNR"). When the SNR becomes very low, a receiver will no longer be able to accurately decode data. When there is a short period of poor SNR, then a receiver may lose some data. Most communications protocols deal with this problem by employing error correction or error detection techniques. By using these, errors in communications can be either corrected, or data can be retransmitted to overcome the errors caused by noise or other factors. When the noise affects the ability of a receiver to maintain alignment with the data frames, the problem is more severe because extended periods of unavailability for communications may result while the receiver attempts to re-align itself.

Thus, the effects of noise, while correctable for short periods of poor SNR, have a greater detrimental effect in the case where the noise affects a receiver's ability to maintain alignment with data frames because the time to reacquire alignment to the data frames is a period when data communications are not possible. Therefore, there is a need in the art to improve the ability of data receivers to achieve and maintain data frame alignment in the presence of poor signal quality.

SUMMARY OF THE INVENTION

The need in the art is addressed by the methods and apparatuses of the present invention. A first method of aligning a receiver with respect to a reference symbol in data frames is taught. The method comprises the steps of decoding each of a plurality of data frames into a plurality of symbols and determining a weight that each of the plurality symbols is a reference symbol. Then, accumulating the weight for each corresponding symbol from the plurality of data frames to a plurality of values, and, aligning the receiver to the symbol corresponding to a one of the plurality of values which exceeds a threshold. In a refinement to the foregoing method, the determining step further includes calculating the weights as probabilities that each decoded symbol is in error with respect to the value of the reference symbol. In another refinement, the determining step utilizes a look-up table of symbol decoding weights. In another refinement, the weights are accumulated to the plurality of values by addition. In another refinement, the weights are accumulated to the plurality of values by multiplication. In another refinement, the threshold is a statistical probability representing a high confidence that the corresponding symbol, or sequence of symbols, is the reference symbol.

The present invention teaches another method of aligning a data receiver to a reoccurring reference symbol in data frames. This method comprises the steps of receiving a signal equal in length to a single data frame, and decoding the signal into a plurality of symbols. Then, determining a plurality of weights that the plurality of symbols are each a reference symbol. The method then repeats the receiving, decoding, and determining steps for a plurality of data frames. Next, are the steps of accumulating sets of the plurality of weights, corresponding to sets of the plurality of symbols, into a plurality of values, and comparing the plurality of values to a threshold, and if a one of the plurality of values exceeds the threshold, aligning the receiver to the symbol corresponding to the one of the plurality of values exceeding the threshold. In a refinement to the foregoing method, the determining step further includes calculating a probability that each decoded symbol is in error with respect to the value of the reference symbol. In another refinement, the determining step utilizes a look-up table of symbol decoding weights. In another refinement, the plurality of weights are accumulated to the plurality of values by addition. In another refinement, the plurality of weights are accumulated to the plurality of values by multiplication. In another refinement, the threshold is a statistical probability representing a high confidence that the corresponding symbol(s) is the reference symbol.

The present invention also teaches a method of aligning a receiver with respect to a plurality of reference symbols of predetermined relative location within data frames. This method comprises the steps of decoding each of a plurality of data frames into a plurality of symbols, and determining a weight that each of the plurality symbols is each of the plurality of reference symbols. Then, accumulating the weights for each corresponding symbol from the plurality of data frames to a plurality of values in an array indexed by the location of the plurality of symbols and the plurality of reference symbols. Then, calculating a plurality of ordinal probabilities by combining the accumulated weights in the array according to the relative predetermined locations of the plurality of reference symbols for each location of the plurality of symbols, organized into a probability value array indexed by the location of each of the plurality of symbols. Finally, aligning the receiver to the symbol indexed to one of the plurality of ordinal probabilities in the probability value array that exceeds a threshold. In a refinement to this method, the determining step further includes calculating the weighted probability that each decoded symbol is in error with respect to the value of the plurality of reference symbols. In another refinement, the determining step utilizes a look-up table of symbol decoding weights. In another refinement, the weights are accumulated to the plurality of values by addition. In another refinement, the weights are accumulated to the plurality of values by multiplication. In another refinement, the accumulated weights are combined to the plurality of ordinal probabilities by addition. In another refinement, the accumulated weights are combined to the plurality of ordinal probabilities by multiplication. In another refinement, the threshold is a statistical probability representing a high confidence that the corresponding symbol is one of the plurality of reference symbols. In another refinement, the plurality of ordinal probabilities are ordered according to the relative positions of the plurality of reference symbols.

The present invention teaches another method of aligning a receiver with respect to a plurality of reference symbols of predetermined relative location within data frames. This method comprises the steps of receiving a data frame, decoding the data frame into a plurality of symbols, and determining a plurality of weighted probabilities that each of the plurality of symbols is each of the plurality of reference symbols. Then, storing the plurality of weighted probabilities into an array, indexed according to each one of the plurality of reference symbols and the location of each one of the plurality of symbols, and repeating the receiving, decoding, and storing steps for a plurality of data frames, and, accumulating the plurality of weighted probabilities in the array. Then, calculating a plurality of ordinal probabilities by combining the accumulated plurality of weighted probabilities in the array according to the relative predetermined locations of the plurality of reference symbols for each location of the plurality of symbols into a probability value array indexed by the location of each of the plurality of symbols, and comparing the plurality of ordinal probabilities in the probability value array to a threshold. Then, if one of the values exceeds a threshold, aligning the receiver to the location of the one of the plurality of symbols indexed to the one of the plurality of values exceeding the threshold. The refinements to the previous method taught by the present invention are equally applicable to this method.

The present invention also teaches a method of aligning a receiver with respect to a plurality of reference symbols of predetermined relative location within data frames. This method comprises the steps of decoding a data frame into a plurality of symbols, and sequencing though the plurality of symbols and determining the weighted probability that the present one of the plurality of symbols is a first one of the plurality of reference symbols, and, determining the weighted probability that the relatively located other of the plurality of symbols corresponding in location to the relative locations of the plurality of reference symbols are the corresponding other of the plurality of reference symbols. Then, combining the weighted probabilities at each step of the sequence into a value and storing the values in an array indexed by the location of the plurality of symbols, and repeating the decoding, sequencing, and combining steps, and accumulating the plurality of the values generated for each data frame in the array. Finally, aligning the receiver to the symbol corresponding to a one of the plurality of values which exceeds a threshold. In a refinement to this method, the sequencing step further includes calculating the weighted probability that each decoded symbol is in error with respect to the value of the reference symbols. In another refinement, the sequencing step utilizes a look-up table of symbol decoding weighted error probabilities. In another refinement, the weighted probabilities are combined by addition. In another refinement, the weighted probabilities are combined by multiplication. In another refinement, the values are accumulated by addition. In another refinement, the values are accumulated by multiplication. In another refinement, the threshold is a statistical probability representing a high confidence that the corresponding symbol is one of the plurality of reference symbols. In another refinement, the sequencing through the plurality of symbols is accomplished with a circular buffer, which is also applicable when the reference symbols are sequential.

The present invention teaches a data receiver operable to align to a reference symbol in a data frame. The data receiver comprises a controller operable to decode each of a plurality of data frames into a plurality of symbols, and operable to determine a weighted probability that each of the plurality symbols is a reference symbol. It also includes a memory coupled to the controller, the controller being operable to accumulate the weighted probabilities for each corresponding symbol from the plurality of data frames to a plurality of values stored in the memory. And, the controller is operable to align to the symbol corresponding to a one of the plurality of values which exceeds a threshold. In a refinement to this invention, the controller calculates the weighted probability that each decoded symbol is in error with respect to the value of the reference symbol. In a further refinement, the controller is operable to access a look-up table of symbol decoding weighted error probabilities in the memory. In a further refinement, the controller accumulates by addition the weighted probabilities to the plurality of values stored in the memory. In a further refinement, the controller accumulates by multiplication the weighted probabilities to the plurality of values stored in the memory.

The present invention also teaches a data receiver operable to align to a reoccurring reference symbol in data frames. The receiver comprises a controller operable to receive a signal equal to a single data frame and a memory coupled to the controller, the controller operable to decode the signal into a plurality of symbols and store them in the memory. And, the controller is operable to determine a plurality of weighted probabilities that the plurality of symbols are each a reference symbol. And, the controller operable to repeatedly receive, decode, and determine a plurality of weighted probabilities for a plurality of data frames. Also, the controller is operable to accumulate sets of the plurality of weighted probabilities into a plurality of values in the memory, each corresponding to sets of the plurality of symbols. Finally, the controller operable to recall and compare the plurality of values to a threshold value, and if a one of the plurality of values exceeds the threshold, operable to align to the symbol corresponding to the one of the plurality of values stored in the memory that exceeds the threshold. In a refinement to this apparatus, the controller determines the plurality of weighted probabilities from a look-up table in the memory. In a further refinement, the controller accumulates by addition the plurality of weighted probabilities to the plurality of values stored in the memory. In a further refinement, the controller accumulates by multiplication the plurality of weighted probabilities to the plurality of values stored in the memory.

The present invention also teaches a data receiver operable to align to a plurality of reference symbols of predetermined relative location within data frames. The receiver comprises a controller operable to decode each of a plurality of data frames into a plurality of symbols, and, a memory coupled to the controller, the controller operable to determine a weighted probability that each of the plurality of symbols is each of the plurality of reference symbols and operable to store the weighted probabilities in the memory. Also, the controller is operable to accumulate the weighted probabilities for each corresponding symbol from the plurality of data frames to a plurality of values and to store them in an array in the memory indexed by the location of the plurality of symbols and the plurality of reference symbols. And, the controller operable to calculate a plurality of ordinal probabilities by combining the accumulated weighted probabilities in the array according to the relative predetermined locations of the plurality of reference symbols for each location of the plurality of symbols, organized into a probability value array in the memory indexed by the location of each of the plurality of symbols. Finally, the controller operable to align to the symbol indexed to a one of the plurality of ordinal probabilities in the probability value array that exceeds a threshold. In a refinement to this apparatus, the controller is operable to recall the plurality of probabilities from a look-up table in the memory. In a further refinement, the controller is operable to accumulate by addition the weighted probabilities to the plurality of values stored in the memory. In a further refinement, the controller is operable to accumulate by multiplication the weighted probabilities to the plurality of values stored in the memory. In a further refinement, the controller is operable to combine by addition the accumulated probabilities to the plurality of ordinal probabilities by addition. In a further refinement, the controller is operable to combine by multiplication the accumulated probabilities to the plurality of ordinal probabilities. In a further refinement, the plurality of ordinal probabilities are ordered according to the relative positions of the plurality of reference symbols.

The present invention also teaches a data receiver operable to align to a plurality of reference symbols of predetermined relative location within data frames. This receiver comprises a controller operable to decode a data frame into a plurality of symbols, and operable to determine a plurality of weighted probabilities that each of the plurality of symbols is each of the plurality of reference symbols. And, a memory coupled to the controller, the controller operable to store the plurality of weighted probabilities into an array in the memory, indexed according to each one of the plurality of reference symbols and the location of each one of the plurality of symbols. Also, the controller operable to repeat the decoding and storing operations for a plurality of data frames, and, operable to accumulate the plurality of weighted probabilities in the array. And, the controller operable to store a probability value array in the memory, having a plurality of ordinal probabilities calculated by combining the accumulated plurality of weighted probabilities in the array according to the relative predetermined locations of the plurality of reference symbols, the probability value array indexed by the location of each of the plurality of symbols. And, the controller operable to compare the plurality of ordinal probabilities in the probability value array to a threshold. And if one values exceeds a threshold, the controller operable to align to the location of the one of the plurality of symbols indexed to the one of the plurality of values exceeding the threshold. In a refinement to this invention, the controller accesses a look-up table of symbol decoding error probabilities in the memory. In another refinement, the controller accumulates by addition the plurality of weighted probabilities in the memory. In another refinement, the controller accumulates by multiplication the plurality of weighted probabilities in the memory. In another refinement, the controller combines by addition the accumulated weighted probabilities to the plurality of ordinal probabilities. In another refinement, the controller combines by multiplication the accumulated weighted probabilities to the plurality of ordinal probabilities.

The present invention also teaches a data receiver operable to align to a plurality of reference symbols of predetermined relative location within data frames. The receiver comprises a controller operable to decode a data frame into a plurality of symbols, and operable to sequence through the plurality of symbols and determine a weighted probability that the present one of the plurality of symbols is a first one of the plurality of reference symbols, and, determine a weighted probability that the relatively located other of the plurality of symbols corresponding in location to the relative locations of the plurality of reference symbols are the corresponding other of the plurality of reference symbols. And, a memory coupled to the controller, the controller operable to combine the weighted probabilities at each iteration of the sequence into a value and store the values in an array in the memory indexed by the location of the plurality of symbols. Also, the controller operable to repeatedly decode, sequence, and combine the weighted probabilities, and to accumulate the plurality of the values generated for each data frame in the array. And, the controller operable to align to the symbol corresponding to a one of the plurality of values which exceeds a threshold. In a refinement to this invention, the controller accesses a look-up table of symbol decoding weighted error probabilities in the memory. In another refinement, the controller combines by addition the plurality of weighted probabilities. In another refinement, the controller combines by multiplication the plurality of probabilities. In another refinement, the controller accumulates by addition the plurality of the values. In another refinement, the controller accumulates by multiplication the plurality of the values. In another refinement, the relative locations of the plurality of reference symbols, and the weighted probabilities associated therewith, are organized in a circular buffer in the memory.

BRIEF DESCRIPTION OF THE DRAWINGS

FIG. 7 is a probability factor look-up table according to an illustrative embodiment of the present invention.

FIG. 8 is a probability factor look-up table according to an illustrative embodiment of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
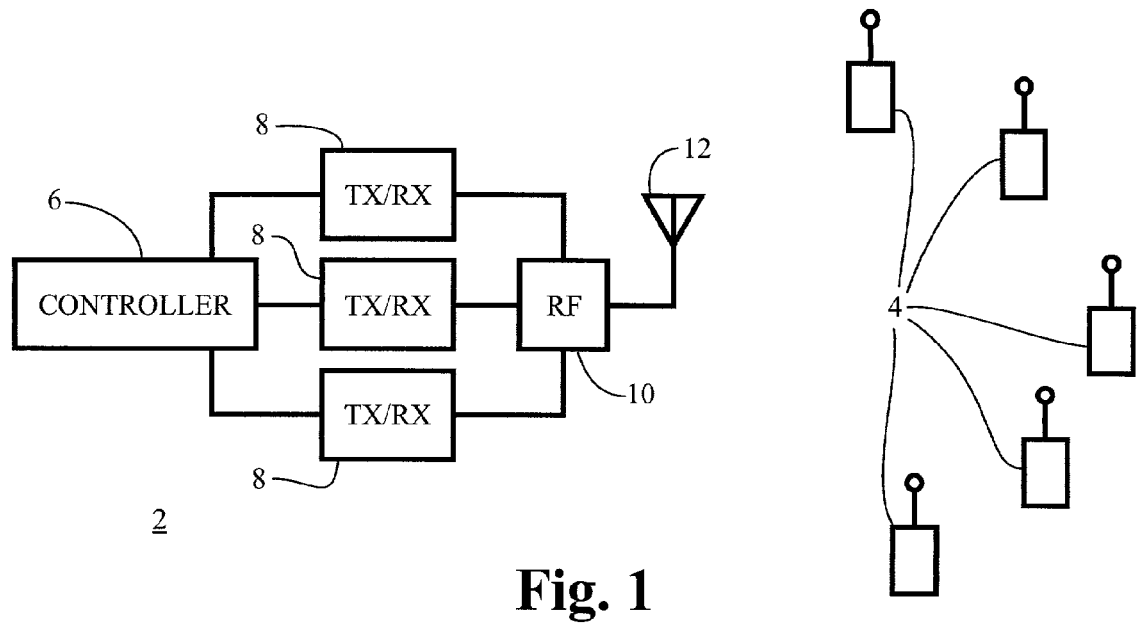
FIG. 1 is a functional block diagram of a communications system according to an illustrative embodiment of the present invention.

The preferred embodiment of the present invention is implemented in a trunked land mobile radio system that employs FDM channelization and TDMA packetized data for channel trunking management, system control, data communications, and voice communications. Reference is directed to FIG. 1, which is a block diagram of such a system. The system includes a repeater base station 2 and a number of radio terminal units 4. The base station 2 has a controller 6, which serves to control and interconnect several radio repeaters 8. The controller 6 may be any of a variety of computers, processors, microprocessor, or other suitable digital controlling devices as are understood by those of ordinary skill in the art. In FIG. 1, three repeaters 8 are shown, however, those skilled in the art will appreciate that the number of repeaters is dependent upon the radio spectrum allocated to the system and may range from one to twenty, or more. The controller 6 provides various kinds of control of the resources within the base station 2, including interconnecting radio and wireline communications resources, generating and interpreting communication protocols, encoding and decoding data, and other control functions. The base station 2 includes radio frequency distribution and combining circuits 10 which interconnect the several radio repeaters 8 to one or more transmit/receive antennas 12. Such circuits are understood by those of ordinary skill in the art.

Figure 2:
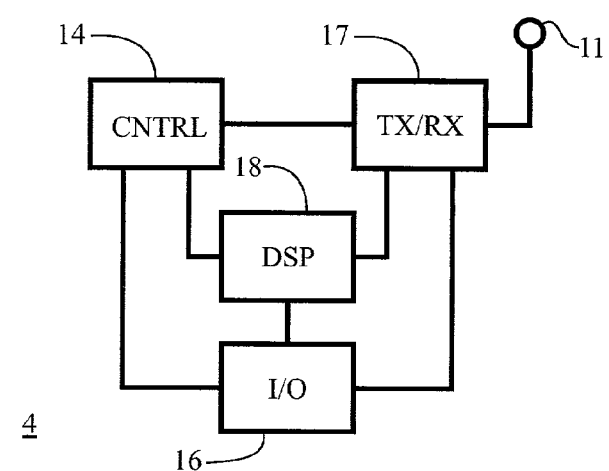
FIG. 2 is a function block diagram of a mobile transceiver according to an illustrative embodiment of the present invention.

Reference is directed to FIG. 2, which is a functional block diagram of a typical terminal unit 4 according to the preferred embodiment of the present invention. The terminal unit 4 communicates via radio frequency waves (not shown) with base station 2 via antenna 12. The terminal unit includes a controller 14 interconnected to a radio transceiver 17, which couples through an antenna 11 to the base station 2. The terminal unit controller 14 provides various control functions in the terminal unit including managing the channel trunking operations, system control, data communications, and voice communication through the terminal unit 4. The controller 14 may be any suitable computer, processor, microprocessor, microcontroller, or other digital control device, as are understood by those of ordinary skill in the art. The controller 14 interfaces with a man-machine interface 16 (I/O) that allows for user interaction with the terminal unit 4. The man-machine interface includes audio input and output, user selectable functions, data input and output and so forth, as is understood by those skilled in the art. The terminal unit may also comprise a digital signal processing device 18 (hereinafter 'DSP'), which is coupled to the controller 14, the man-machine interface 16, and the radio transceiver 12. Because the terminal unit 4 operates in multiple modes of operation, with a large number of system and user features, and according to a protocol with various utilization of data communications, the DSP 18 greatly simplifies the hardware design by providing for programmable flexibility.

Figure 3:
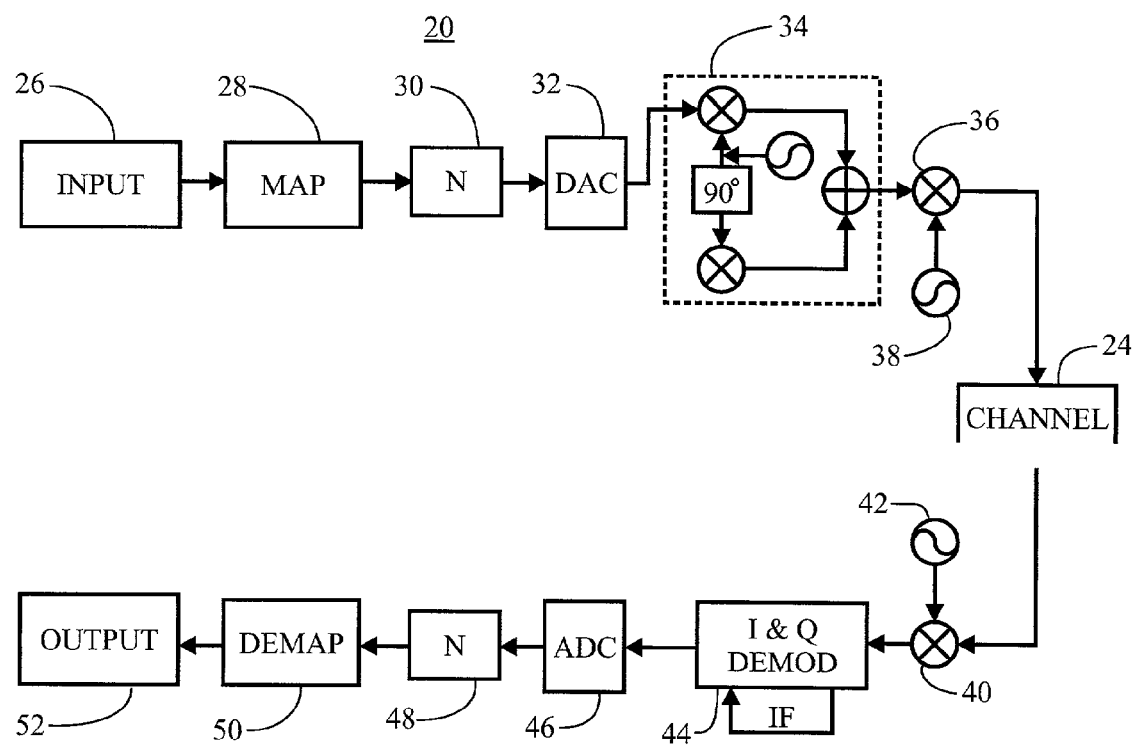
FIG. 3 is a functional block diagram of the end to end communications process according to an illustrative embodiment of the present invention.

Reference is now directed to FIG. 3, which is a function block diagram of a transmitter circuit 20 in communication with a receiver circuit 22 through a communications channel 24 according in an illustrative embodiment of the present invention. For greater details of this embodiment, see co-pending U.S. patent application Ser. No. 09/295,660 filed Apr. 12, 1999 entitled BANDWIDTH EFFICIENT QAM ON A TDM-FDM SYSTEM FOR WIRELESS COMMUNICATIONS, the contents of which is hereby incorporated by reference thereto. In the transmitter circuit 20, digital information is presented to an input circuit 26. This information may be digitized audio or digital data in the preferred embodiment. The digital information is provided as a digital signal by input circuit 26 to mapping circuit 28. The mapping circuit controls pulse timing, bit organization, and the mapping of the digital signal into the signal modulation constellation of the QAM modulator used in this illustrative embodiment. These concepts are understood by those skilled in the art. The modulation constellation will be more fully developed herein after.

Mapping circuit 28 produces two digital outputs for the in-phase and quadrature-phase inputs of the QAM modulator 34, which are first coupled through a Nyquist filter 30 and a digital to analog converter 32. The QAM modulator 34 contains the usual internal components, (not numbered) such as an intermediate frequency ("IF") reference oscillator, a first mixer, a 90 degree phase shifter, adder, and so forth. The QAM modulated signal is output from modulator 34 to a second mixer 36 which combines the signal with a carrier oscillator 38 and outputs the modulated carrier to the communications channel 24.

The receiver circuit 22 in FIG. 7 is also coupled to the channel 24 and receives the modulated carrier. The receiver 22 performs essentially the reverse functions of the transmitter circuit 20. The QAM modulated RF signal is received from channel 24 and coupled to a mixer 40 that is excited by a RF oscillator 42. The resultant QAM modulated IF signal is coupled to I&Q demodulator 44 which serves to produce the corresponding in-phase and quadrature-phase outputs at the baseband. These analog signals are coupled to analog to digital converter 46, which converts the signals to the digital domain prior to subsequent coupling to Nyquist digital filters 48. The outputs of the Nyquist filter 48 comprise the received digital information, which is coded in the form of four-bit symbols in the preferred embodiment. Demapping circuit 50 demaps the symbols and provides them to output circuit 52 of subsequent use and interpretation.

Figure 4:
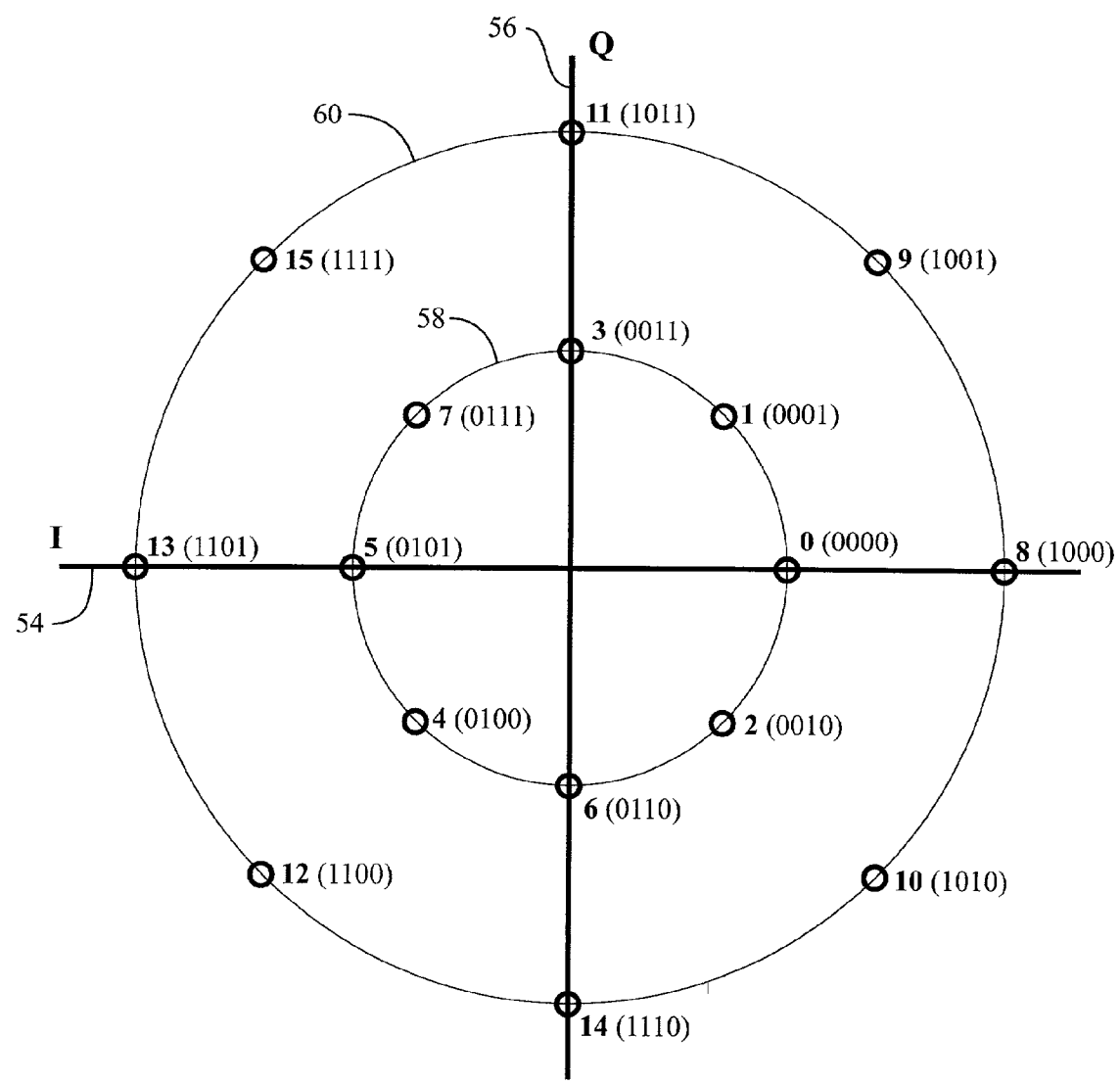
FIG. 4 is a constellation diagram of the symbol coding according to an illustrative embodiment of the present invention.

Reference is directed to FIG. 4, which is a constellation diagram of the QAM modulated signal according to the preferred embodiment of the present invention. In QAM, information is modulated in both phase and amplitude. FIG. 4 represents this information along the in-phase ("I") axis 54 and quadrature-phase ("Q") axis 56. Sixteen points, numbered according to the decimal equivalent to the binary value each symbol on the constellation encodes, appear on the constellation, see generally FIG. 4. Thus, it will be appreciated that there are two amplitude levels and eight phase angle positions used to encode the data onto the constellation. This creates an inner ring 58 and an outer ring 60, around which all of the constellation points are located, in the preferred embodiment.

In the preferred embodiment, demodulation occurs after symbol synchronization correction. Symbol synchronization assures that the sample points bearing the symbol information are down-sampled and chosen for demodulation. Amplitude and phase [amplitude=$(I^2+Q^2)^{0.5}$, and Phase=$Tan^{-1}(Q/I)$] are extracted for use in the demodulator. In the preferred embodiment, the magnitude of the complex symbols are not calculated as magnitudes, but are approximated by the following set of equations:

Magnitude approximation:

$$min_i = MIN(ABS(I_i), ABS(Q_i))$$

$$max_i = MAX(ABS(I_i), ABS(Q_i))$$

if (min*4≧max):

$$MAG_i = (max_i*7 + min_i*4)/8$$

else:

$$MAG_i = max_i$$

Also, in the preferred embodiment, differential encoding and decoding are used, and the constellation is gray coded to minimize bit errors.

As noted above, the numbers (decimal "0" through "15") in FIG. 4 are the decimal equivalent of the four binary digits of each symbol. The placement of the numbers in the complex plane indicate the amount of phase and amplitude change which will result if those few bits are modulated. The phase change is referenced to the symbol zero. That is, when a "0" or "8" is modulated no change in phase occurs. If a "1" or a "9" is sent, the carrier phase changes plus 45 degrees over a symbol period. A change in amplitude occurs if one of the numbers on the outer ring 60 is sent. For example, if the present amplitude and phase of the carrier is "1.8" at angle "+135" degrees, then if a "14" is modulated, the amplitude and the phase at the end of the symbol period will be "1.0" at "+45" degrees because the "14" causes a "−90" degree change in phase and a change in amplitude. Converting to orthogonal coordinates I=−1.273 and Q=+1.273 changes to I=+0.707 and Q=+0.707.

In real-world implementations of the foregoing modulation scheme, low signal strength, fading conditions and noise can interfere with signal receptions. The net result may be that certain symbols on the constellation will be decoded incorrectly in the receiver. When this happens, a data decoding error occurs. The effect of such data errors can be mitigated through the use of error detection and corrections scheme, and such schemes are employed in the preferred embodiment. However, at some level, the errors in data decoding pass a threshold above which the errors cripple the performance of the preferred embodiment, or any other, system.

Figure 5:
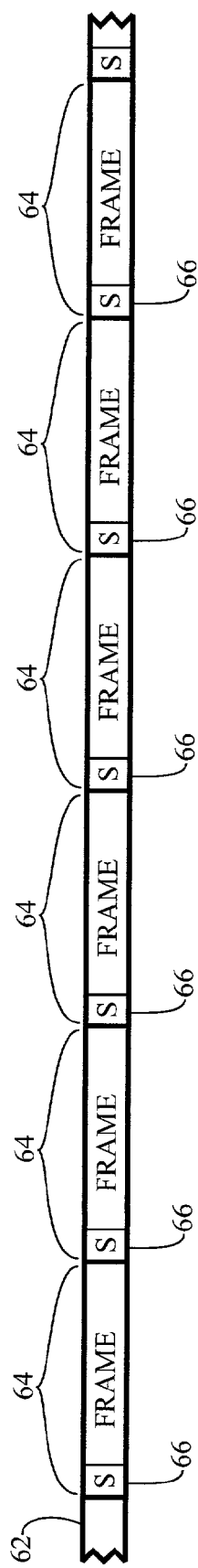
FIG. 5 is a timing diagram of a synchronized frame-based communications scheme as it exists in the prior art.

Reference is directed to FIG. 5, which shows a TDMA framing structure. This is a typical structure utilized both in the prior art and in an illustrative embodiment of the present invention. A continuous stream of data 62 is transmitted by a transmitter (not shown) and arrives at a given receiver (not shown). Initially, there is no time reference in the receiver to align to the data stream. The data stream 62 is sub-divided into a plurality of data frames 64 that have a predetermined amount of data contained in each. That is, each frame has a fixed number of data bits, and the rate at which data is transmitted is predetermined so that the duration of each frame is also predetermined. What is not inherent in such an arrangement is a reference as to what bit, or symbol, marks the beginning of each data frame 64. Thus, it is necessary for the receiver to align to the data frames 64 which are reoccurring in data stream 62.

Each data frame 64 includes a bit synchronization pattern 66. The receiver is operable to recognize this synchronization pattern and thereby is operable to align to the beginning of each data frame. This makes it possible for the receiver to align to all of the data in each data frame 64, and therefore, enables the receiver to decode the data. In practical application, the synchronization bit patterns 66 are a plurality of bits in a predetermined order. This bit pattern can be referred to as a synchronization symbol, or simply a symbol. Note that there is a potential for confusion between the concept of a synchronization symbol, and a symbol transmitted in the aforementioned QAM modulation scheme. While there can be a direct correlation between the two, it need not necessarily be so.

In operation, when a receiver has yet to align itself with the incoming data stream 62, it simply begins decoding the data stream and testing to determine where the synchronization symbol appears. When it is located, the receiver aligns itself with the synchronization symbol and can then begin decoding all the data in each frame. Of course, those of skill in the art will appreciate that this process is not so simple, and has a great potential for erroneous symbol recognition and misalignment. First of all, there is a possibility that the bit pattern that is defined as the synchronization symbol may randomly appear in the data stream. If the receiver synchronizes to this data, the result will be misalignment. This problem is overcome in the prior art with a number of approaches. One technique is to define a synchronization symbol and a data encoding scheme such that the synchronization symbol bit pattern will never appear in the data. Another approach is for the receiver to make two or more samplings of the data stream at intervals equal to the frame length to be certain that the synchronization symbol is actually a reoccurring symbol, as is illustrated in FIG. 5.

Another potential problem when decoding and aligning to the synchronization symbol is the potential for a decoding error. If this occurs, then data in the frame 64 may be incorrectly interpreted as a synchronization symbol, or a valid synchronization symbol may not be properly interpreted as a synchronization symbol. Certain error correction schemes can and have been employed to mitigate these kinds of decoding errors, but errors cannot be fully eliminated. This issue is particularly significant in radio based data transmission systems. In radio environments, the vagaries of signal propagation, noise, and other factors greatly increase the likelihood that a bit or symbol will be decoded in error. Thus, it is challenging to design a system that is reliable and robust in its ability to decode and align to a data framed system, such as that illustrated in FIG. 5.

Another aspect of TDMA system design involves the way in which a receiver utilizes the data transmitted to it. Frequently, the transmitted signal may contain data targeted for plurality of receivers. The transmitter transmits a continuous stream of information and all of the receivers monitor the data stream, waiting for information that is pertinent to them. In a similar vein, the receivers may monitor the data stream so as to be ready to quickly access the data when needed. In both of these situations, speed is of the essence. A receiver must either be ready to receive information at the instant that it is transmitted, or, be ready to access the data stream at the instant when access is required. In either case, it is necessary for the receiver to maintain alignment with the transmitted data stream. Receivers typically maintain alignment by keeping track of the frame synchronization symbols as they arrive. Thus, it will be understood that the challenge lies in maintaining alignment with the data stream in an environment where signal quality varies and symbol decoding is likely to contain errors.

If an error, or several errors, in synchronization symbol decoding occur, then prior art receivers lose synchronization and must restart a process of aligning to the transmitted data signal anew. This is a time consuming process, and in some systems can result in an unacceptably long period during which data access is unavailable to the receiver. In the case of the preferred embodiment trunked land mobile radio system, in addition to the process of merely aligning to the data stream, the receiver may also have to process through an acquisition and check-in procedure. Thus it is highly desirable to avoid losing synchronization once it has been acquired. There is a need to tolerate missed synchronization symbols and decoding errors so that synchronization can be better maintained in the presence of data transmission errors, yet still maintain a high confidence that the receiver is properly aligned to the frames within the data stream so that data is accurately decoded in general.

The present invention achieves the goal of becoming more error tolerant by using a statistical process that determines the likelihood that errors have happened, and, by gathering data about such errors which are used to calculate a threshold degree of confidence that synchronization symbols are present, thereby allowing the receiver to maintain alignment in the presence of noise.

Figure 6:
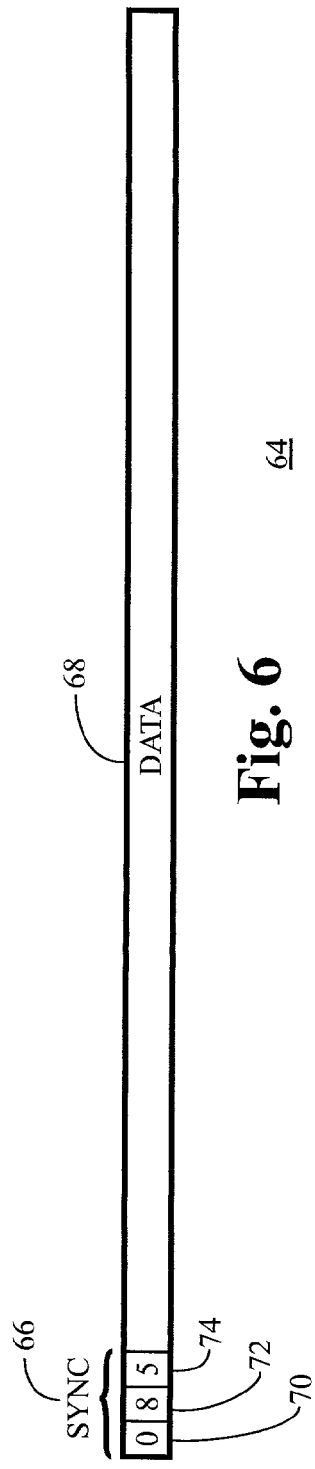
FIG. 6 is a frame timing diagram according to an illustrative embodiment of the present invention.

As discussed above, the preferred embodiment trunked radio system employs a QAM modulated data signal that transmits sequences of four-bit binary symbols. FIG. 6 illustrates a typical data frame 64 in the preferred embodiment system. The synchronization symbol 66 is actually composed of three QAM symbols 70, 72, and 74. In the preferred embodiment, these have the decimal values of "0", "8", and "5" respectively. Thus, the synchronization symbol is "085" decimal or "0000 1000 0101" binary. Of course, other values could be selected based on various system design considerations. In the preferred embodiment, the data frame 64 is comprised of one hundred-twenty QAM symbols, three of which are dedicated to the "085" synchronization symbol. The remaining one hundred-seventeen symbols 68 are used to transmit data according to the protocol employed by the system. With respect to the present invention, only the first three QAM symbols, 70, 72, and 74, which comprise the reoccurring synchronization symbols, are of interest.

Considering again FIG. 4, as each QAM symbol is decoded, both the amplitude and phase of the received signal carry information about the point on the constellation that is being transmitted. If an error occurs in the decoding of any given symbol, it is intuitive that the erroneously decoded symbol value will most likely be near the phase and amplitude values of the actually transmitted QAM symbol. For example, if a QAM "8" symbol is transmitted, and an error in decoding occurs, it is more likely that a slight phase decoding error occurred (say as a "9" or "10") than a large phase error (say a "13"). Similar reasoning applied to errors in amplitude as well. Therefore, for any given symbol, it is possible to estimate that likelihood that a decoding error has occurred based on the relationship of the location on the QAM constellation. This likelihood is affected by the signal to noise ratio (hereinafter "SNR") of the received signal, in the preferred embodiment.

Those of skill in the art of QAM radio system design will understand that good data performance, measured by the ability of a receiver to maintain alignment with a synchronized data signal, is readily achievable in a 10 dB SNR environment. A higher ratio makes synchronization performance even better. But as the ratio lowers, and SNR degrades, decoding errors quickly lead to lost synchronization and alignment. The present invention allows such receivers to maintain synchronization and alignment in lower SNR environments. Empirical tests and quantitative analysis have demonstrated that good data alignment and synchronization performance are achievable in a 3 dB SNR environment by utilizing the teachings of the present invention. It should be understood that this value represents neither ceiling nor floor to performance. Other thresholds can be set, or approached, once those skilled in the art have access to the teaching herein.

In terms of statistics, the approximate phase and amplitude probability distribution functions ("PDF") of the QAM modulation scheme employed in the illustrative embodiment can be written as:

$$PDF(phase) = \frac{k}{\sqrt{2\pi}} e^{-k^2(\theta-\theta_0)^2} \quad (1)$$

$$PDF(amplitude) = \frac{1}{\sigma\sqrt{2\pi}} e^{\frac{-(s-\mu)^2}{2\sigma^2}} \quad (2)$$

then, assuming a Gaussian distribution of decoding errors and a 3 dB signal to noise ration, the combined probability for phase and amplitude are calculated by:

$$Prob \cdot (\theta, s) = \frac{k}{\sqrt{2\pi}} \int_{-\pi/8}^{\pi/8} e^{\frac{-k^2(\theta-\theta_0)^2}{2}} d\theta \cdot \frac{1}{\sigma\sqrt{2\pi}} \int_{1.4}^{\infty} e^{\frac{-(s-\mu)^2}{2\sigma^2}} ds \quad (3)$$

where k is the signal to noise ratio, $\sigma$ is the standard deviation, $\mu$ is the mean amplitude, s is the reference amplitude, $\theta$ is the actual phase angle, and $\theta_0$ is the reference phase angle. Applying Equation (3) yields probabilities ranging from 0.0 to 1.0.

Reference is directed to FIG. 7, which is a map of the calculated decoding error probabilities according to the preferred embodiment of the present invention. The map 76 comprises a table 78 of weighting factors ranging from "0" to "39" where "39" represents the highest probability and "0" represents the lowest probability that a given symbol is been decoded correctly. The calculated probabilities from Equation (3) were scaled to the value, or weight, of "39" which was empirically determined for use in the microprocessor environment. The table is indexed by the sixteen binary constellation values 80, which are "0" through "15", and by the three synchronization symbol values 82, which are "0", "8", and "5". The table is used to identify a weighted probability of decoding error for each decoded symbol. For example, if a "0" is decoded, and it is desired to determine the likelihood of error respecting the symbol "0", the table produces a "39", which is the highest confidence of accuracy. On the other hand, if a "0" is decoded and the error respecting the symbol "13" is tested, the table returns a "0" confidence, which is the lowest probability of accuracy, and the highest probability of error. Reviewing FIG. 4 will show that "0" and "13" are 180 degrees apart and on different rings of the constellation, and so it is intuitive that a "0" decoded value is very unlikely to be a "13" symbol which has been incorrectly decoded.

In application, the probability values in table 76 of FIG. 5 are problematic. As will be more fully described herein after, these values are accumulated over many frames of data, and then are added or multiplied three at a time. The magnitude value of the result becomes so large that it can exceed the maximum value of a sixteen bit binary value (which is 65,536). This forces a system designer to use double precision variables, and thus consume more system memory and processing time handling the larger variables. The solution to this is to scale the probability values so that the maximum magnitude never exceeds the sixteen bit size of a fixed point variable. The scaled probability values, according to the preferred embodiment of the present invention, appear in probability map 84 shown in FIG. 8. The table 86 now comprises values that range from 10, the highest confidence of accuracy, to "0", the lowest. Again, the table is indexed by the sixteen constellation values 88 and the three synchronization values 90.

The present invention takes advantage of the fact that the synchronization symbol in a continuous data stream reoccurs for each data frame. By continuously receiving and decoding the data stream, and by calculating the probability of decoding error for every symbol received, the receiver is able to accumulate the probabilities over many data frames. Since the decoding errors tend to be randomly distributed, reasonably approximated by a Gaussian distribution, the likelihood is that over many data frames, the probabilities will accumulate such that the actual synchronization symbol or symbols is readily distinguishable from the other data. This is in fact the case, so a suitable threshold is selected to delimit the probabilities to a reasonably high confidence of accuracy.

Figure 9:
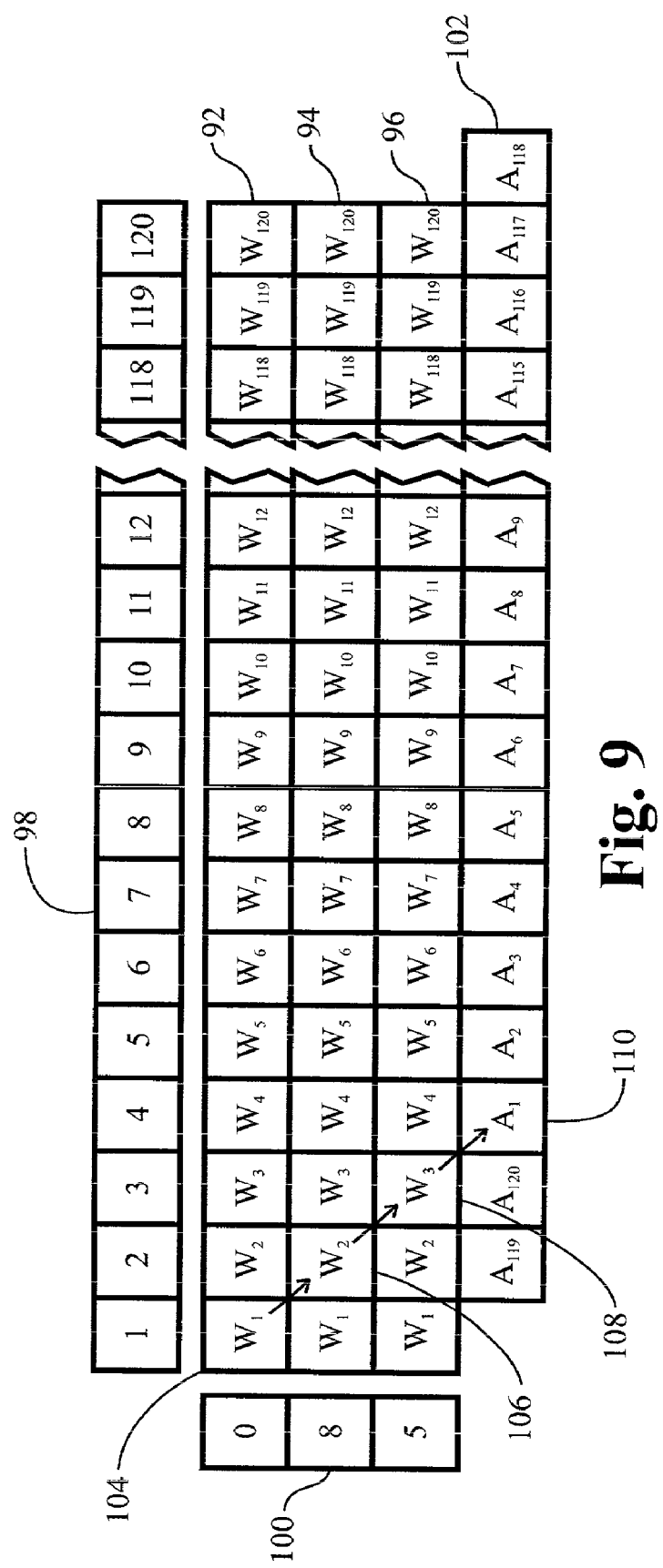
FIG. 9 is a memory array diagram according to an illustrative embodiment of the present invention.

Reference is directed to FIG. 9, which is a memory map of an array used in the probability accumulation process according to an illustrative embodiment of the present invention. The memory array has three ranges 92, 94, and 96 of storage locations for storing the accumulated weighting factors. Each range has one hundred twenty locations corresponding to the number of symbols in a data frame of the preferred embodiment system. There are three ranges, which correspond to the three QAM symbols that comprise the synchronization symbol. Thus, the array is indexed by the number of symbols in the data frame 98 and the number of QAM symbols 100 in the synchronization symbol. An accumulated value array 102 also appears in FIG. 9, which will be more fully described below. As data frames are decoded in this illustrative embodiment, the probabilities are accumulated into weighting factors in the array. As each symbol is decoded, three probabilities are determined for it from the probability map illustrated in FIG. 8. One each for the three QAM symbols in the synchronization symbol. These probabilities are accumulated in the weighting factors associated with the particular frame being decoded in the array in FIG. 9. Each symbol that is decoded is thus given a probability weight of being each of the three QAM symbols and these probability weights are accumulated over a number of frames.

Since it is predetermined by the protocol definition that the three QAM symbols that make up the synchronization symbol are "0", "8", and "5" and that they appear adjacent to one another in that order, the weighting factors accumulated in the array in FIG. 9 can be combined to enhance the determination of the likelihood of a match, or alignment. This is illustrated in FIG. 9 by combining the "0" weighting factor 104 with the "8" weighting factor 106 and the "5" weighting factor 108 into combined values 110. While this is illustrated for frame slot "1" in FIG. 9, it is to be understood that this same combination occurs for every slot in the frame. Hence, the combination array 102 has one hundred twenty locations that each corresponds to one of the one hundred twenty symbol slots in the illustrative embodiment systems. The combination of weighting factors can be through addition of their respective values, or through multiplication of their respective values. The accumulation of several frames of probabilities tends to cancel the errors caused by noise. Thus, the weighting factors in the array in FIG. 9 tend to peak at the symbol value matching the location the symbol within the frame. This is greatly enhanced by the ordinal relationship of the three QAM symbols, because the likelihood of error decreases dramatically as the three ordered peak values precipitate from the gathering data.

Figure 10:
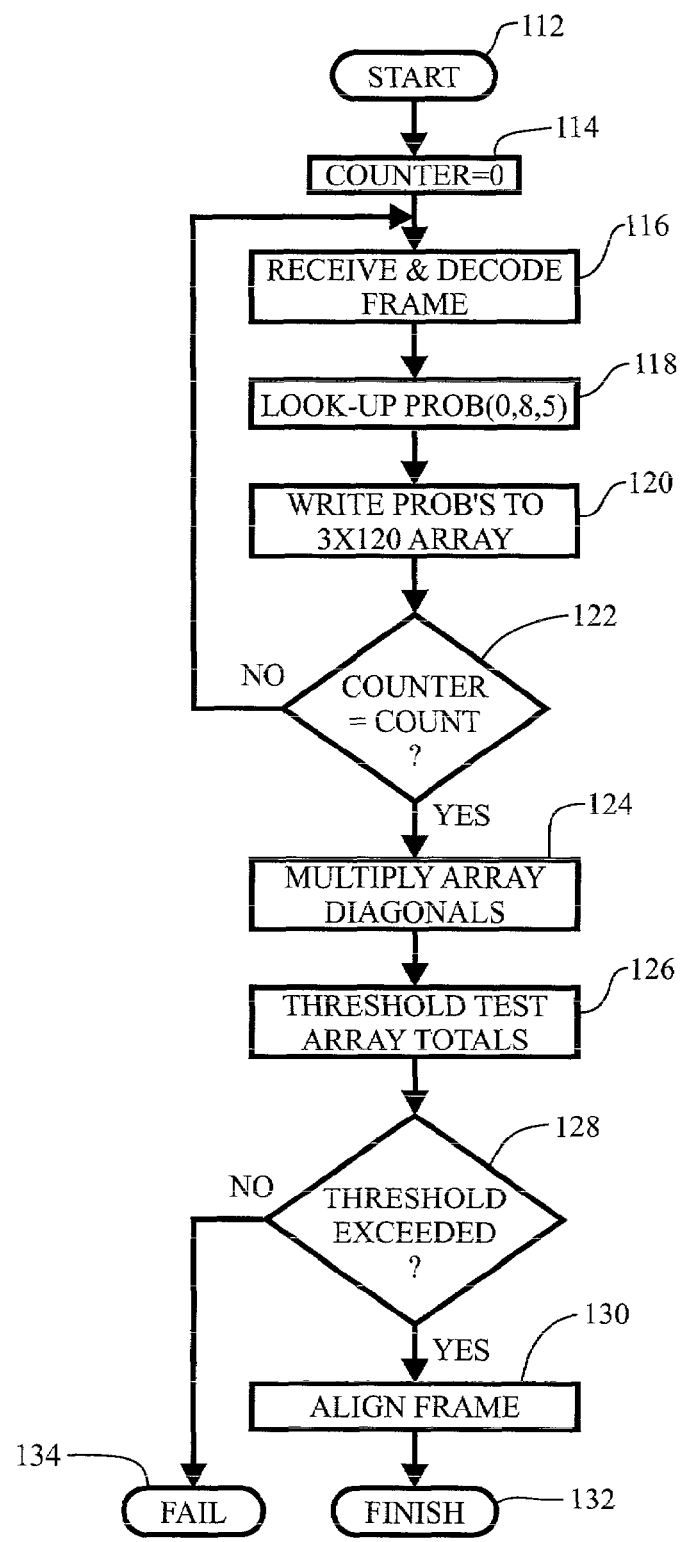
FIG. 10 is a flow diagram of an illustrative embodiment of the present invention.
Figure 11:
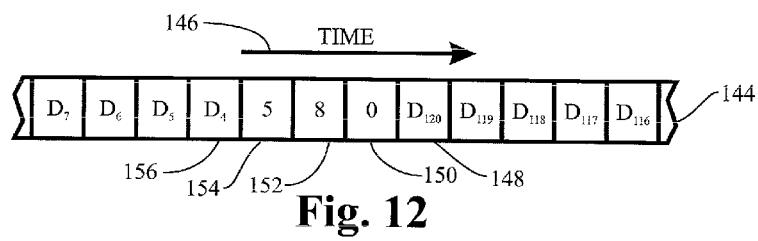
FIG. 11 is a probability look-up table according to an illustrative embodiment of the present invention.

FIG. 10 is a flow diagram depicting the aforementioned sequence, in an illustrative embodiment of the present invention. The process begins at step 112 and proceeds to step 114 where a counter in software is set to zero. At step 116, a frame of data symbols are received and decoded. At step 118, the probability weights of decoding error for each symbol in that frame is determined by reference to the table illustrated in FIG. 8. The probability weights may be either actually calculated probabilities, or weighted probabilities that are determined by an empirical process. At step 120, those probabilities (or empirically determined weighted probabilities) are written to the array depicted in FIG. 9, at locations corresponding to the slots that are being decoded and the three QAM symbol values. At step 122, the count variable is tested to determine if the count maximum has been reached. In this illustrative embodiment, that count is set to equal thirty frames, which represents the number of TDM frames that will be decoded to establish a probability of alignment. If the count value is not met at step 12, then flow recirculates to step 116 and another frame is decoded. On the other hand, if the count variable is exceeded at step 122, then the array diagonals are multiplied at step 124. The diagonals are multiplied because in this illustrative embodiment, the three QAM symbols are adjacent to one another. This means that a diagonal of locations selected through the array (as illustrated in FIG. 9) will combine the weighting of each of the three QAM symbols in the synchronization symbol. It will be appreciated that if the QAM symbols were located elsewhere in the frame, the appropriate symbols would be selected and multiplied to generate the combined weighted total. Also, the use of a product in the combination is a design choice. The weighted probabilities could be added to a sum, or other mathematical operations could be employed to combine their weightings together.

Continuing with FIG. 10, at step 126 and 128, the totals of the combined diagonals are tested against a threshold value to determine if one of them exceeds that threshold. If it does, then there is a sufficiently high confidence that the synchronization symbol has been identified (as being the symbol corresponding with that combined total). The selection of a threshold value will be discussed herein after. At step 130, the receiver is aligned to the frame at the corresponding symbol, and the process is finished at step 132. If, at step 128 none of the combined totals exceed the threshold, then the routine has failed to align and returns to the calling subroutine.

In the foregoing embodiment, the array used to accumulate the weighted probabilities is equal in size to the number of symbols per slot by the number of QAM symbols in the synchronization symbol. In situations where memory space is at a premium, the amount of memory required to manage the probabilities can be reduced, as is demonstrated by the following illustrative embodiment. This reduction is accomplished by combining the determined probability weights before accumulating the weighted averages. Reference is directed to FIGS. 11, 12, 13, 14, and 15 for a better understanding of this process.

Figure 12:
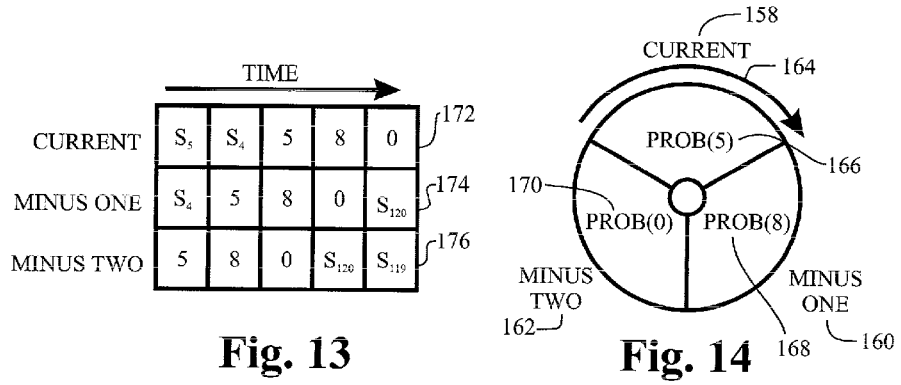
FIG. 12 is a data sequence timing diagram according to an illustrative embodiment of the present invention.
Figures 13, 14:
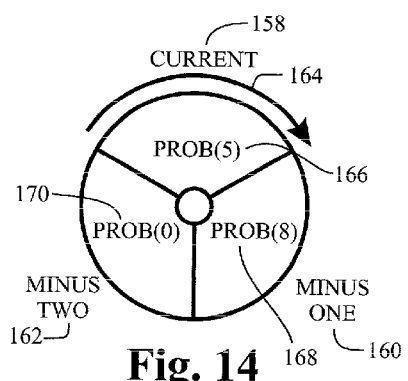
FIG. 13 is a buffer timing sequence diagram according to an illustrative embodiment of the present invention.
FIG. 14 is a diagram of a circular buffer according to an illustrative embodiment of the present invention.
Figure 15:
FIG. 15 is a memory array diagram according to an illustrative embodiment of the present invention.

FIG. 15 is a memory diagram 136 of the scaled decoding weighted error probabilities used in this illustrative embodiment. Note that these are the same values as those that appeared in FIG. 8. The table 138 comprises values that range from "10", the highest confidence of accuracy, to "0", the lowest. The table is indexed by the sixteen constellation values 140 and the three synchronization values 142. In operation, the receiver receives the symbol data with the passage of time. This concept is illustrated in FIG. 12. A stream of data 144 is processed through the receiver as time 146 passes. Each frame ultimately ends with the last data symbol 148. The next symbol is the first QAM symbol 150 of the synchronization symbol. Then next is the second QAM symbol 152, followed by the third QAM symbol 154, the three of which constitute the entire synchronization symbol. The next symbol is the first useable data symbol 156, which is the fourth frame symbol ($D_4$). The receiver maintains a running buffer of the current and two most recently received QAM symbols. This buffer is illustrated as a circular buffer in FIG. 14. FIG. 13 shows the content of the circular buffer with the passage of time, and is presented as an aid in understanding the concepts of this illustrative embodiment. The circular buffer of FIG. 14 has three values stored in it at any given moment. These include the CURRENT symbol 158, the MINUS ONE (in time) symbol 160, and the MINUS TWO (in time) symbol 162. Now, referring to FIG. 13, the relationship of the contents of the buffer storage locations with the passage of time can be understood. The contents of the CURRENT location 172 leads the MINUS ONE location 174 by one symbol, and the MINUS TWO location 176 by two symbols. As each new symbol is received, the buffer is advanced 164 and the new symbol is loaded into the CURRENT location 158 in the buffer. Then, the scaled, or weighted, probabilities for the "5" symbol 166 is determined for the CURRENT buffer 158, the probability for the "8" symbol 168 is determined for the MINUS ONE buffer 160, and the probability for the "0" symbol 170 is determined for the MINUS TWO buffer 162. The receiver combines these three scaled, or weighted, probabilities and saves the value to a combined array 178, which appears in FIG. 15. The probability weights can be combined by product, sum, or other mathematical operation. These may be calculated probabilities or empirically determined weighted probabilities, or merely weight values. The buffer is synchronized with the combined value array so that as subsequent frames of data are received and decoded, the scaled totals are combined in the same corresponding location in the array.

Figure 16:
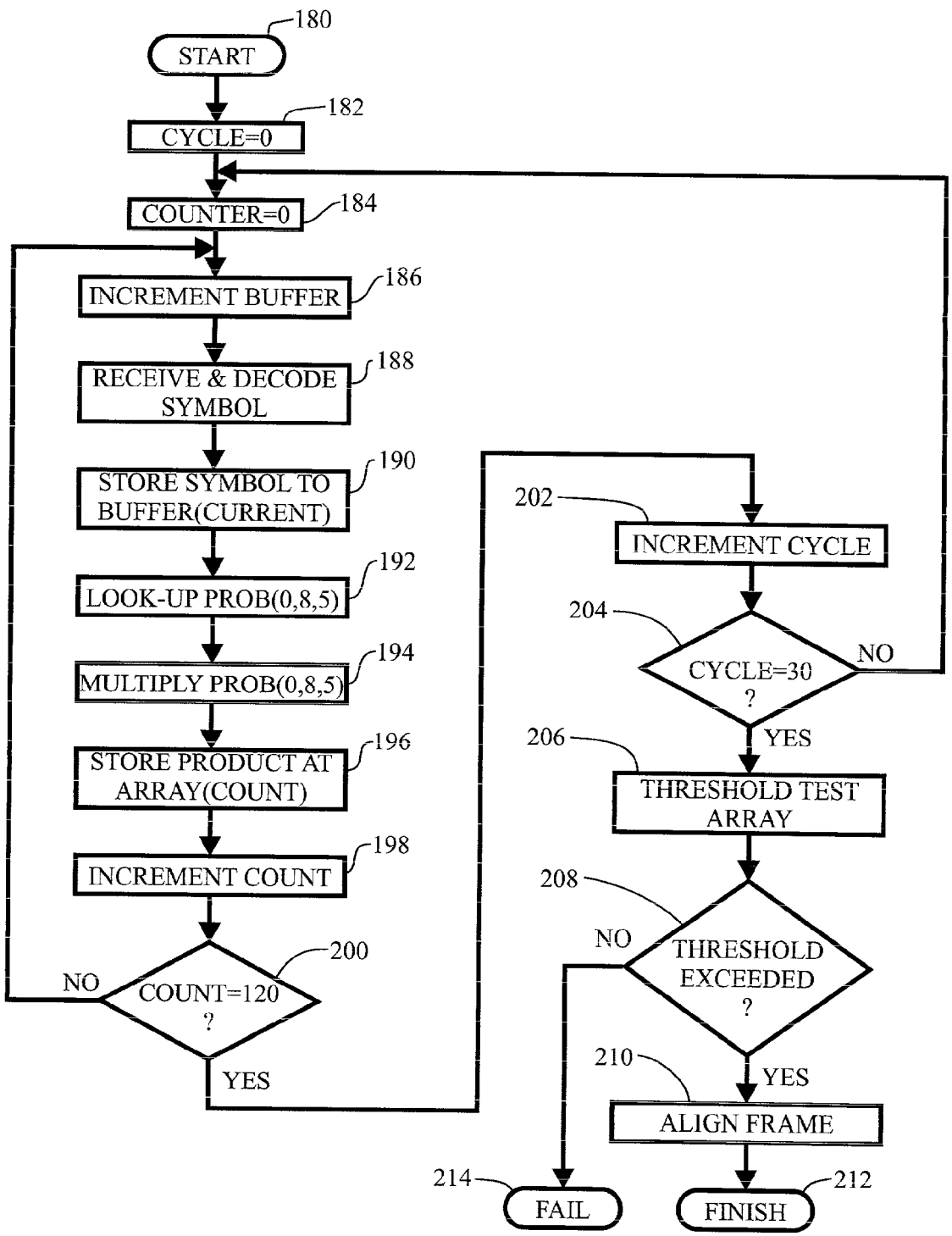
FIG. 16 is a flow diagram according to an illustrative embodiment of the present invention.

The foregoing receiver alignment system is illustrated in another perspective in the flow diagram of FIG. 16. This is a process that starts at step 180 and proceeds to step 182 where a cycle counter is set to zero. The cycle counter keeps track of the number of data frames that have been decoded, which in the preferred embodiment is thirty frames. At step 184, a counter is also set to zero count. The counter keeps track of how many data symbols there are in each data frame, which is one hundred twenty in the preferred embodiment. At step 186, the circular buffer is incremented in anticipation of receiving a data symbol. At step 188, a data symbol is received and decoded by the receiver. At step 190, the decoded symbol is stored in the circular buffer in the CURRENT position. The buffer is presumed to have been filled during the previous two symbol periods so that there are now three decoded symbols residing in the buffer. Thus, at step 192, the scaled probabilities of all three symbols in the buffer are determined. This is accomplished by looking each up in the table illustrated in FIG. 11, although they could also be calculated in real time. At step 194, the scaled probabilities are multiplied together (or added) and the product (or sum) is accumulated in the array at step 196 in the location corresponding to the current count position. At step 198, the count is incremented. If at step 200, the count has not reached one hundred twenty, flow recirculates to step 186 for receipt of the next symbol in the current frame.

On the other hand, at step 200, if the count has reached one hundred twenty, then a data frame has been completed and the cycle variable is incremented at step 202. At step 204, the cycle variable is tested to determine if thirty frames have been accumulated. If not, flow recirculates to step 186 to begin a new frame. If thirty frames have been accumulated at step 204, then the array of combined probabilities are test against the threshold at step 206 to determine if any exceeds the threshold value. If not, the process has failed and returns at step 214. IF, at step 208, one of the combined totals exceeds the threshold, then the receiver aligns to the frame at step 210 and returns at step 212.

The present invention utilizes a statistical approach in identifying the presence of a frame synchronization symbol(s) in data frames so that the data receiver can maintain alignment with the reoccurring data frames, even in the presence of noise. As was discussed above, in the case of a QAM modulated system, good synchronization performance is known in the prior art at a 10 dB SNR. In an illustrative embodiment of the present invention, 3 dB SNR was chosen as a target level because it represents a substantial improvement in performance over the prior art, and has been determined to be readily achievable in view of the teachings of the present invention. The utilization of the teachings employ the use of a threshold value that establishes a confidence level acceptably high so that proper alignment to the data frames is maintained. This also can be used to detect a signal.

Figure 17:
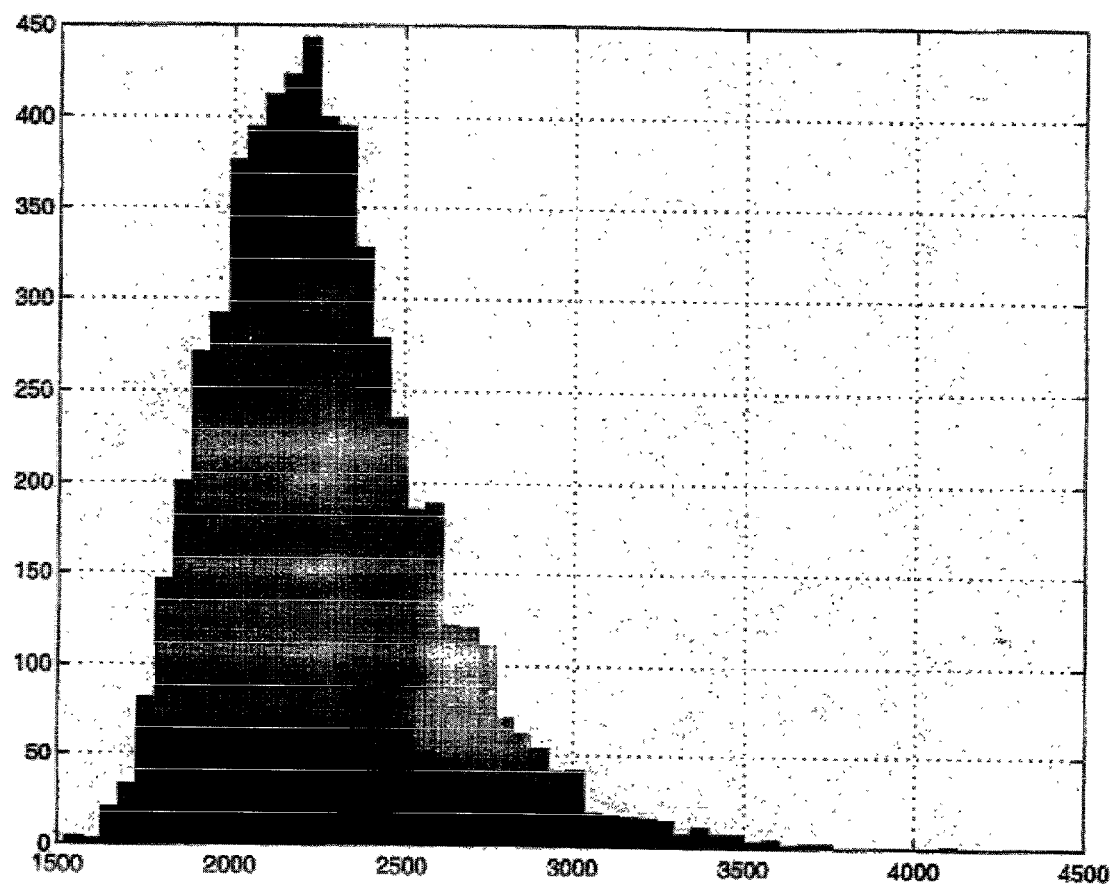
FIG. 17 is a bar chart of test results according to an illustrative embodiment of the present invention.

An empirical approach can be employed to establish a suitable threshold value. Attention is directed to FIG. 17, which is a bar chart illustrating test results. A test was run where a receiver decoded symbols in an environment where no signal was present, rather naturally occurring background noise. This was modeled as a moving vehicle (70 mph) in a 3 dB fading environment with a missing adjacent subchannel. A receiver according to the present invention decoded tens of thousands of data frame periods and accumulated the number of samples according to each error probability value. The values in the table in FIG. 8 were used, and, thirty frame periods were decoded for each combined total value. This implies a maximum value of 30,000 (10 plus 10 plus 10, times 30) and a minimum value of zero (0 plus 0 plus 0, times 30). The results are plotted in FIG. 17, in histogram fashion. The vertical axis represents the number of 30 frame sample periods that equaled the combined probability shown along the horizontal axis of the chart in FIG. 17. Sample totals ranged from 1600 to 4200. The statistical peak was at about 2200, as can be seen in FIG. 17.

Figure 18:
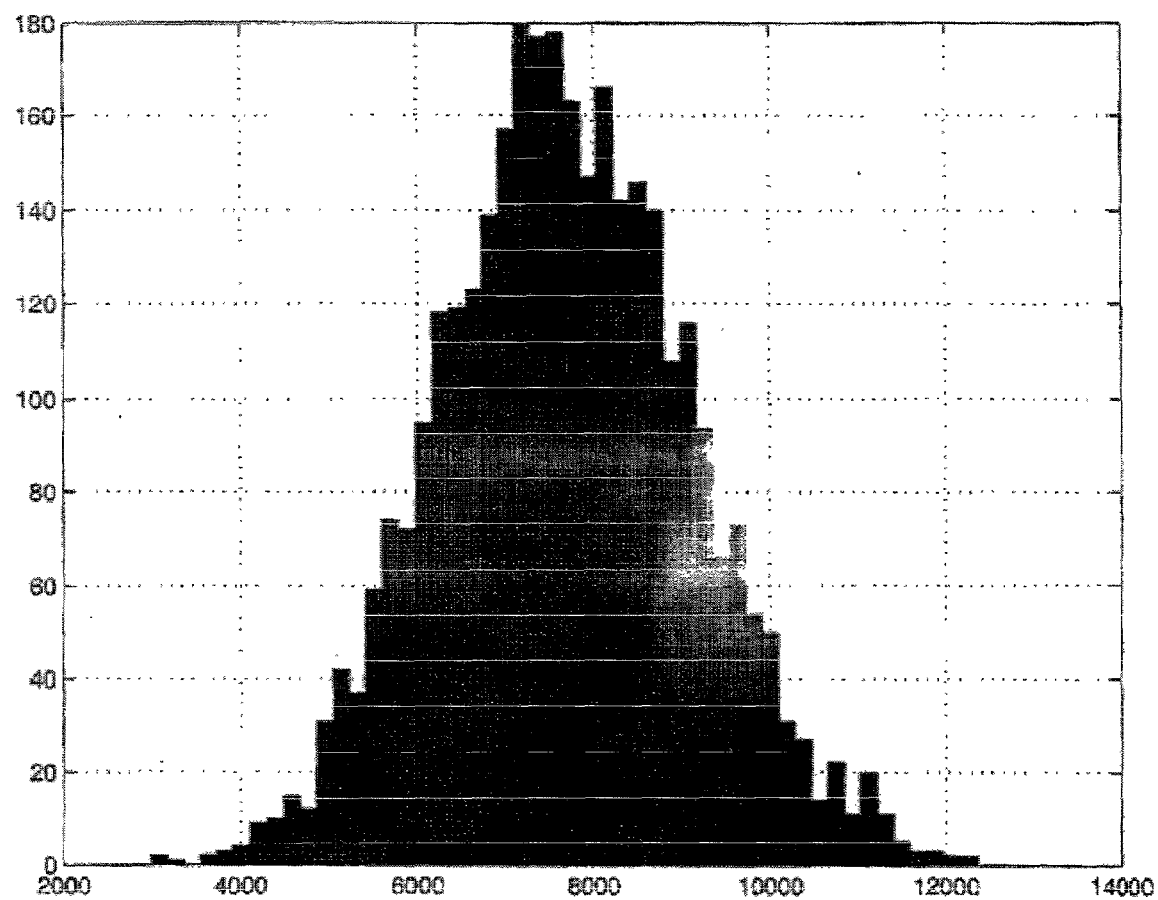
FIG. 18 is a bar chart of test results according to an illustrative embodiment of the present invention.

FIG. 18 shows a bar chart of test results arranged as in FIG. 17. However, in FIG. 18, an actual signal, comprising synchronization symbols, was transmitted at a 3 dB SNR, again modeled at 70 mph and in a fading environment. The same potential combined values apply (e.g. 0 to 30,000). In this case, the results ranged from about 3000 to 12,500, with a peak at about 7500. A threshold value of 6000 was selected as a suitable value. This is because it is greater than the maximum random value (4200 from FIG. 17) and is below the peak value in FIG. 18. Thus, this threshold value is not likely to synchronize in error, but will synchronize where prior art designs could not, thus achieving the benefits desired.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

The invention claimed is:

1. A method of aligning a receiver with respect to a reference symbol in data frames, comprising the steps of:
   decoding each of a plurality of data frames into a plurality of symbols;
   determining a weight value that each of said plurality symbols is a reference symbol;
   accumulating said weight values for each corresponding symbol from said plurality of data frames to a plurality of values, and
   aligning the receiver to the symbol corresponding to a one of said plurality of values which exceeds a threshold, wherein said determining step further includes calculating the probability that each decoded symbol is in error with respect to the value of said reference symbol.

2. The method in claim 1, and wherein said determining step utilizes a look-up table of symbol decoding weight values.

3. The method of claim 1, and wherein said weight values are accumulated to said plurality of values by addition.

4. The method of claim 1, and wherein said weight values are accumulated to said plurality of values by multiplication.

5. The method of claim 1, and wherein said threshold is a statistical probability representing a high confidence that the corresponding symbol is said reference symbol.

6. A method of aligning a data receiver to a reoccurring reference symbol in data frames, comprising the steps of:
   receiving a signal equal to a single data frame;
   decoding said signal into a plurality of symbols;
   determining a plurality of weighted values that said plurality of symbols are each a reference symbol;
   repeating said receiving, decoding, and determining steps for a plurality of data frames;
   accumulating sets of said plurality of weighted values, corresponding to sets of said plurality of symbols, into a plurality of values;
   comparing said plurality of values to a threshold, and if a one of said plurality of values exceeds said threshold,
   aligning the receiver to the symbol corresponding to the one of said plurality of values exceeding said threshold, wherein said determining step further includes calculating the weighted values as probabilities that each decoded symbol is in error with respect to the value of said reference symbol.

7. The method in claim 6, and wherein said determining step utilizes a look-up table of symbol decoding weighted values.

8. The method of claim 6, and wherein said plurality of weighted values are accumulated to said plurality of values by addition.

9. The method of claim 6, and wherein said plurality of weighted values are accumulated to said plurality of values by multiplication.

10. The method of claim 6, and wherein said threshold is a statistical probability representing a high confidence that the corresponding symbol is said reference symbol.

11. A method of aligning a receiver with respect to a plurality of reference symbols of predetermined relative location within data frames, comprising the steps of:
    decoding each of a plurality of data frames into a plurality of symbols;
    determining a weighted value that each of said plurality symbols is each of the plurality of reference symbols;
    accumulating said weighted values for each corresponding symbol from said plurality of data frames to a plurality of values in an array indexed by the location of said plurality of symbols and said plurality of reference symbols;
    calculating a plurality of ordinal probabilities by combining said accumulated weighted values in said array according to the relative predetermined locations of said plurality of reference symbols for each location of said plurality of symbols, organized into a weighted value array indexed by said location of each of said plurality of symbols, and
    aligning the receiver to the symbol indexed to a one of said plurality of ordinal probabilities in said weighted value array that exceeds a threshold, wherein said determining step further includes calculating the probability that each decoded symbol is in error with respect to the value of said plurality of reference symbols.

12. The method in claim 11, and wherein said determining step utilizes a look-up table of symbol decoding weighted values.

13. The method of claim 11, and wherein said weighted values are accumulated to said plurality of values by addition.

14. The method of claim 11, and wherein said weighted values are accumulated to said plurality of values by multiplication.

15. The method of claim 11, and wherein said accumulated values are combined to said plurality of ordinal probabilities by addition.

16. The method of claim 11, and wherein said accumulated values are combined to said plurality of ordinal probabilities by multiplication.

17. The method of claim 11, and wherein said threshold is a statistical probability representing a high confidence that the corresponding symbol is one of said plurality of reference symbols.

18. The method of claim 11, and wherein said plurality of ordinal probabilities or ordered according to the relative positions of said plurality of reference symbols.

19. A method of aligning a receiver with respect to a plurality of reference symbols of predetermined relative location within data frames, comprising the steps of:
receiving a data frame;
decoding said data frame into a plurality of symbols;
determining a plurality of probabilities that each of said plurality of symbols is each of said plurality of reference symbols;
storing said plurality of probabilities into an array, indexed according to each one of said plurality of reference symbols and the location of each one of said plurality of symbols;
repeating said receiving, decoding, and storing steps for a plurality of data frames, and, accumulating said plurality of probabilities in said array;
calculating a plurality of ordinal probabilities by combining said accumulated plurality of probabilities in said array according to the relative predetermined locations of said plurality of reference symbols for each location of said plurality of symbols into a probability value array indexed by said location of each of said plurality of symbols;
comparing said plurality of ordinal probabilities in said probability value array to a threshold, and if a one values exceeds a threshold,
aligning the receiver to the location of the one of said plurality of symbols indexed to the one of said plurality of values exceeding said threshold, wherein said determining step further includes calculating the probability that each decoded symbol is in error with respect to the value of said plurality of reference symbols.

20. The method in claim 19, and wherein said determining step utilizes a look-up table of symbol decoding error probabilities.

21. The method of claim 19, and wherein said plurality of probabilities are accumulated by addition.

22. The method of claim 19, and wherein said probabilities are accumulated by multiplication.

23. The method of claim 19, and wherein said accumulated probabilities are combined to said plurality of ordinal probabilities by addition.

24. The method of claim 19, and wherein said accumulated probabilities are combined to said plurality of ordinal probabilities by multiplication.

25. The method of claim 19, and wherein said threshold is a statistical probability representing a high confidence that the corresponding symbol is one of said plurality of reference symbols.

26. The method of claim 19, and wherein said plurality of ordinal probabilities or ordered according to the relative positions of said plurality of reference symbols.

27. A method of aligning a receiver with respect to a plurality of reference symbols of predetermined relative location within data frames, comprising the steps of:
decoding a data frame into a plurality of symbols;
sequencing through said plurality of symbols and determining the probability that the present one of said plurality of symbols is a first one of said plurality of reference symbols, and, determining the weighted probability that the relatively located other of said plurality of symbols corresponding in location to the relative locations of the plurality of reference symbols are the corresponding other of said plurality of reference symbols;
combining said weighted probabilities at each step of said sequence into a value and storing said values in an array indexed by the location of said plurality of symbols;
repeating said decoding, sequencing, and combining steps, and accumulating the plurality of said values generated for each data frame in said array, and
aligning the receiver to the symbol corresponding to a one of said plurality of values which exceeds a threshold, wherein said seguencing step further includes calculating the weighted probability that each decoded symbol is in error with respect to the value of said reference symbols.

28. The method in claim 27, and wherein said sequencing step utilizes a look-up table of symbol decoding weighted error probabilities.

29. The method of claim 27, and wherein said plurality of weighted probabilities are combined by addition.

30. The method of claim 27, and wherein said weighted probabilities are combined by multiplication.

31. The method of claim 27, and wherein the plurality of said values are accumulated by addition.

32. The method of claim 27, and wherein the plurality of said values are accumulated by multiplication.

33. The method of claim 27, and wherein said threshold is a statistical probability representing a high confidence that the corresponding symbol is one of said plurality of reference symbols.

34. The method of claim 27, and wherein said sequencing through said plurality of symbols is accomplished with a circular buffer.

35. A data receiver operable to align to a reference symbol in a data frame, comprising:
a controller operable to decode each of a plurality of data frames into a plurality of symbols, and operable to determine a weighted probability that each of said plurality symbols is a reference symbol;
a memory coupled to said controller, said controller operable to accumulate said weighted probabilities for each corresponding symbol from said plurality of data frames to a plurality of values stored in said memory, and wherein
said controller is operable to align to the symbol corresponding to a one of said plurality of values which exceeds a threshold, wherein said controller calculates the weighted probability that each decoded symbol is in error with respect to the value of said reference symbol.

36. The apparatus in claim 35, and wherein said controller is operable to access a look-up table of symbol decoding weighted error probabilities in said memory.

37. The apparatus of claim 35, and wherein said controller accumulates by addition said weighted probabilities to said plurality of values stored in said memory.

38. The apparatus of claim 35, and wherein said controller accumulates by multiplication said weighted probabilities to said plurality of values stored in said memory.

39. A data receiver operable to align to a reoccurring reference symbol in data frames, comprising:
a controller operable to receive a signal equal to a single data frame;
a memory coupled to said controller, said controller operable to decode said signal into a plurality of symbols and store them in said memory;

said controller operable to determine a plurality of weighted probabilities that said plurality of symbols are each a reference symbol;

said controller operable to repeatedly receive, decode, and determine a plurality of weighted probabilities for a plurality of data frames;

said controller operable to accumulate sets of said plurality of weighted probabilities into a plurality of values in said memory, each corresponding to sets of said plurality of symbols;

said controller operable to recall and compare said plurality of values to a threshold value, and if a one of said plurality of values exceeds said threshold, operable to align to the symbol corresponding to the one of said plurality of values stored in said memory that exceeds said threshold, wherein said controller calculates the weighted probability that each decoded symbol is in error with respect to the value of said reference symbol.

40. The apparatus in claim 39, and wherein said controller determines said plurality of weighted probabilities from a look-up table in said memory.

41. The apparatus of claim 39, and wherein said controller accumulates by addition said plurality of weighted probabilities to said plurality of values stored in said memory.

42. The apparatus of claim 39, and wherein said controller accumulates by multiplication said plurality of weighted probabilities to said plurality of values stored in said memory.

43. A data receiver operable to align to a plurality of reference symbols of predetermined relative location within data frames, comprising:

a controller operable to decode each of a plurality of data frames into a plurality of symbols;

a memory coupled to said controller, said controller operable to determine a weighted probability that each of said plurality of symbols is each of the plurality of reference symbols and operable to store said probabilities in said memory;

said controller operable to accumulate said weighted probabilities for each corresponding symbol from said plurality of data frames to a plurality of values and to store them in an array in said memory indexed by the location of said plurality of symbols and said plurality of reference symbols;

said controller operable to calculate a plurality of ordinal probabilities by combining said accumulated weighted probabilities in said array according to the relative predetermined locations of said plurality of reference symbols for each location of said plurality of symbols, organized into a probability value array in said memory indexed by said location of each of said plurality of symbols, and said controller operable to align to the symbol indexed to a one of said plurality of ordinal probabilities in said probability value array that exceeds a threshold.

44. The apparatus in claim 43, and wherein said controller is operable to recall said plurality of weighted probabilities from a look-up table in said memory.

45. The apparatus of claim 43, and wherein said controller is operable to accumulate by addition said weighted probabilities to said plurality of values stored in said memory.

46. The apparatus of claim 43, and wherein said controller is operable to accumulate by multiplication said weighted probabilities to said plurality of values stored in said memory.

47. The apparatus of claim 43, and wherein said controller is operable to combine by addition said accumulated weighted probabilities to said plurality of ordinal probabilities by addition.

48. The apparatus of claim 43, and wherein said controller is operable to combine by multiplication said accumulated weighted probabilities to said plurality of ordinal probabilities by multiplication.

49. The apparatus of claim 43, and wherein said plurality of ordinal probabilities or ordered according to the relative positions of said plurality of reference symbols.

50. A data receiver operable to align to a plurality of reference symbols of predetermined relative location within data frames, comprising:

a controller operable to decode a data frame into a plurality of symbols, and operable to determine a plurality of weighted probabilities that each of said plurality of symbols is each of said plurality of reference symbols;

a memory coupled to said controller, said controller operable to store said plurality of weighted probabilities into an array in said memory, indexed according to each one of said plurality of reference symbols and the location of each one of said plurality of symbols;

said controller operable to repeat said decoding and storing operations for a plurality of data frames, and, operable to accumulate said plurality of weighted probabilities in said array;

said controller operable to store a probability value array in said memory, having a plurality of ordinal probabilities calculated by combining said accumulated plurality of weighted probabilities in said array according to the relative predetermined locations of said plurality of reference symbols, said probability value array indexed by said location of each of said plurality of symbols;

said controller operable to compare said plurality of ordinal probabilities in said probability value array to a threshold, and if a one values exceeds a threshold, said controller operable to align to the location of the one of said plurality of symbols indexed to the one of said plurality of values exceeding said threshold, wherein said controller accesses a look-up table of symbol decoding weighed error probabilities in said memory.

51. The apparatus of claim 50, and wherein said controller accumulates by addition said plurality of weighted probabilities in said memory.

52. The apparatus of claim 50, and wherein said controller accumulates by multiplication said plurality of weighted probabilities in said memory.

53. The apparatus of claim 50, and wherein said controller combines by addition said accumulated probabilities to said plurality of ordinal probabilities.

54. The apparatus of claim 50, and wherein said controller combines by multiplication said accumulated probabilities to said plurality of ordinal probabilities.

55. A data receiver operable to align to a plurality of reference symbols of predetermined relative location within data frames, comprising:

a controller operable to decode a data frame into a plurality of symbols, and operable to sequence through said plurality of symbols and determine a weighted probability that the present one of said plurality of symbols is a first one of said plurality of reference symbols, and, determine a weighted probability that the relatively located other of said plurality of symbols corresponding in location to the relative locations of the plurality of reference symbols are the corresponding other of said plurality of reference symbols;

a memory coupled to said controller, said controller operable to combine said weighted probabilities at each iteration of said sequence into a value and store said values in an array in said memory indexed by the location of said plurality of symbols;

said controller operable to repeatedly decode, sequence, and combine said weighted probabilities, and to accumulate the plurality of said values generated for each data frame in said array, and said controller operable to align to the symbol corresponding to a one of said plurality of values which exceeds a threshold, wherein said controller accesses a look-up table of symbol decoding weighed error probabilities in said memory.

56. The apparatus of claim 55, and wherein said controller combines by addition said plurality of weighted probabilities.

57. The apparatus of claim 55, and wherein said controller combines by multiplication said plurality of weighted probabilities.

58. The apparatus of claim 55, and wherein said controller accumulates by addition the plurality of said values.

59. The apparatus of claim 55, and wherein said controller accumulates by multiplication the plurality of said values.

60. The apparatus of claim 55, and wherein the relative locations of the plurality of reference symbols, and the probabilities associated therewith, are organized in a circular buffer in said memory.

* * * * *